US012639245B2

(12) United States Patent
Salinas Hernando et al.

(10) Patent No.: US 12,639,245 B2
(45) Date of Patent: May 26, 2026

(54) INTEGRATED CIRCUIT

(71) Applicant: Rockwell Collins, Inc., Cedar Rapids, IA (US)

(72) Inventors: Gonzalo Salinas Hernando, Cork City (IE); Alejandro Garcia Gener, Cork (IE); Fabio Federici, Tornimparte (IT)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/672,994

(22) Filed: May 23, 2024

(65) Prior Publication Data

US 2024/0403252 A1    Dec. 5, 2024

(30) Foreign Application Priority Data

May 30, 2023    (EP) ..................................... 23176157

(51) Int. Cl.
*G06F 13/40*          (2006.01)
*G06F 13/42*          (2006.01)

(52) U.S. Cl.
CPC ...... *G06F 13/4068* (2013.01); *G06F 13/4291* (2013.01)

(58) Field of Classification Search
CPC ............. G06F 13/4068; G06F 13/4291; G06F 15/7821; G06F 15/7842
See application file for complete search history.

(56) References Cited

U.S. PATENT DOCUMENTS

| | | | |
|---|---|---|---|
| 8,943,287 B1 | 1/2015 | Miller et al. | |
| 9,436,619 B2 | 9/2016 | Woolley | |
| 10,664,325 B1 | 5/2020 | Radack et al. | |
| 11,106,205 B2 | 8/2021 | Adamski | |
| 11,275,709 B2 | 3/2022 | Tamir et al. | |
| 2006/0090084 A1* | 4/2006 | Buer ....................... | G06F 21/53 |
| | | | 713/189 |
| 2008/0066074 A1* | 3/2008 | Nutter ..................... | G06F 21/71 |
| | | | 718/107 |
| 2014/0026146 A1* | 1/2014 | Jahagirdar ............ | G06F 9/5083 |
| | | | 718/105 |
| 2020/0293667 A1* | 9/2020 | Kim ....................... | G06F 21/107 |

(Continued)

FOREIGN PATENT DOCUMENTS

WO          2008067918 A1      6/2008

OTHER PUBLICATIONS

Extended European Search Report dated Nov. 21, 2023; European Application No. 23176157.8.

(Continued)

*Primary Examiner* — Phong H Dang
(74) *Attorney, Agent, or Firm* — Suiter Swantz IP

(57)          ABSTRACT

An integrated circuit may include two processing cores. Each processing core may include: a core controller operable to execute instructions to perform processing tasks; a memory resource connected to the core controller; and a hardware accelerator module connected to the core controller. The integrated circuit may further include: a shared bus connected to the respective hardware accelerator modules of the two processing cores; and a shared memory resource connected to the shared bus; where the only communication path between the two processing cores is via the hardware accelerator modules and the shared bus.

14 Claims, 3 Drawing Sheets

(56) References Cited

U.S. PATENT DOCUMENTS

| | | | |
|---|---|---|---|
| 2020/0336303 A1* | 10/2020 | Sierra | H04L 63/1475 |
| 2024/0020150 A1* | 1/2024 | Dorris | G06F 9/5027 |
| 2024/0273334 A1* | 8/2024 | Lee | G06N 3/063 |

OTHER PUBLICATIONS

Bronleewe et al., "Runtime Encryption of Memory with Intel Total Memory Encryption-Multi-Key (Intel TME-MK)," Intel.com, Mar. 25, 2023, 9 pages.
European Patent Office, European Office Action received in EP Application No. 23176157.8, Jul. 2, 2025, 7 pages.

* cited by examiner

INTEGRATED CIRCUIT

CROSS-REFERENCE TO RELATED APPLICATIONS

The present application claims the benefit of European Patent Application No. 23176157.8, entitled INTEGRATED CIRCUIT, filed May 30, 2023, which is herein incorporated by reference in the entirety.

TECHNICAL FIELD

The present disclosure relates generally to integrated circuits and, in particular, to integrated circuits for high criticality applications.

BACKGROUND

The need for improved performance and dependability is becoming a reality in all embedded computing systems. Autonomy, security, or enhanced data analytics for embedded Prognostics and Health Monitoring (PHM), among others, are imposing the use of new and a higher number of sensors and communication capabilities. Safety and/or security is often not a primary objective in the design of commercial general-purpose processors.

As such, there is a need for an improved integrated circuit for high-criticality applications.

SUMMARY

The present disclosure relates to an integrated circuit comprising: two processing cores, where each processing core comprises: a core controller operable to execute instructions to perform processing tasks; a memory resource connected to the core controller; and a hardware accelerator module connected to the core controller; where the integrated circuit further comprises: a shared bus connected to the respective hardware accelerator modules of the two processing cores; and a shared memory resource connected to the shared bus; and where the only communication path between the two processing cores is via the hardware accelerator modules and the shared bus.

In an embodiment, the two processing cores may be heterogeneous.

In an embodiment, the clock frequency of one of the two processing cores may be faster than the clock frequency of the other one of the two processing cores.

In an embodiment, the integrated circuit may further comprise two isolated subsystems; where each processing core is associated with a respective subsystem; where each subsystem comprises a dedicated system bus configured to connect the respective associated processing core to components of the subsystem; and where the system bus of a respective subsystem is isolated from the system bus of the respective other subsystem.

In an embodiment, each system bus may be connected to the respective associated processing core by means of a crossbar connection.

In an embodiment, a first one of the two subsystems may further comprise an external memory bus configured to be connected to an external memory resource.

In an embodiment, a second one of the two subsystems may further comprise a peripherals bus configured to be connected to one or more peripheral resources.

In an embodiment, the memory resource of each processing core may comprise a data memory resource and an instruction memory resource.

In an embodiment, the data memory resource may be a tightly integrated data memory.

In an embodiment, the instruction memory resource may be a tightly integrated instruction memory.

In an embodiment, the hardware accelerator module of each processing core may be configured to perform cryptographic operations.

In an embodiment, the hardware accelerator module of each processing core may be configured to execute instructions from the RISC-V instruction set.

In an embodiment, the hardware accelerator module of each processing core may be configured to communicate with its associated processing core using a custom instruction interface.

In an embodiment, the hardware accelerator module is configured to provide data from the memory resource of one of the two processing cores to the shared memory resource via the shared bus.

In an embodiment, the hardware accelerator module is further configured to send an interrupt signal to the other one of the two processing cores to indicate that new data is available in the shared memory resource.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the present disclosure will now be described in greater detail by way of example only and with reference to the accompanying drawings, in which.

DETAILED DESCRIPTION

The technology described herein may be useful in avionics applications.

An integrated circuit as disclosed herein comprises: two processing cores, where each processing core comprises: a core controller operable to execute instructions to perform processing tasks; a memory resource connected to the core controller; and a hardware accelerator module connected to the core controller; where the integrated circuit further comprises: a shared bus connected to the respective hardware accelerator modules of the two processing cores; and a shared memory resource connected to the shared bus; and where the only communication path between the two processing cores is via the hardware accelerator modules and the shared bus.

By providing two isolated subsystems where the only communication path between the respective processing cores of the isolated subsystems is via the hardware accelerator modules and the shared bus, it is possible to provide improved security. In particular, in the event of an external attack on one of the two cores, the isolation of the other core makes it possible for that core to continue to operate safely. In addition, the isolated nature of the two subsystems make it possible to ensure confidentiality of assets between the two subsystems.

The duplication of resources (e.g., providing a respective memory resource for each subsystem) and the isolation of the two subsystems makes it possible to provide more robust systems. For example, in the event of a fault in one subsystem, the other subsystem may continue running since it has its own resources which are isolated from those of the subsystem which has experienced the fault. The separation of the two memory resources in the system (i.e., the respective memory resources for each of the subsystems) allows a fault in one memory resource to be contained in that memory resource in the one subsystem while the other subsystem continues to operate.

A further advantage of the integrated circuits described herein is the reduction of contention in the system owing to the dedicated resources provided for each processing core or subsystem. By providing dedicated resources for each processing core or subsystem, it is possible to reduce the occurrence of, or entirely avoid, any situation in which two cores are competing for the same resource. As such, the time determinism within the system can be improved as it is not necessary to take contention into account. Processing time for particular tasks can therefore be more accurately predicted since each command can be expected to take a prescribed amount of time for that command and it can be determined when each command will be executed. This is in contrast to systems in which contention is present since in such systems it is not possible to determine when a command will be executed owing to contention causing possible delays in the system, e.g., in data retrieval.

Figure 1:
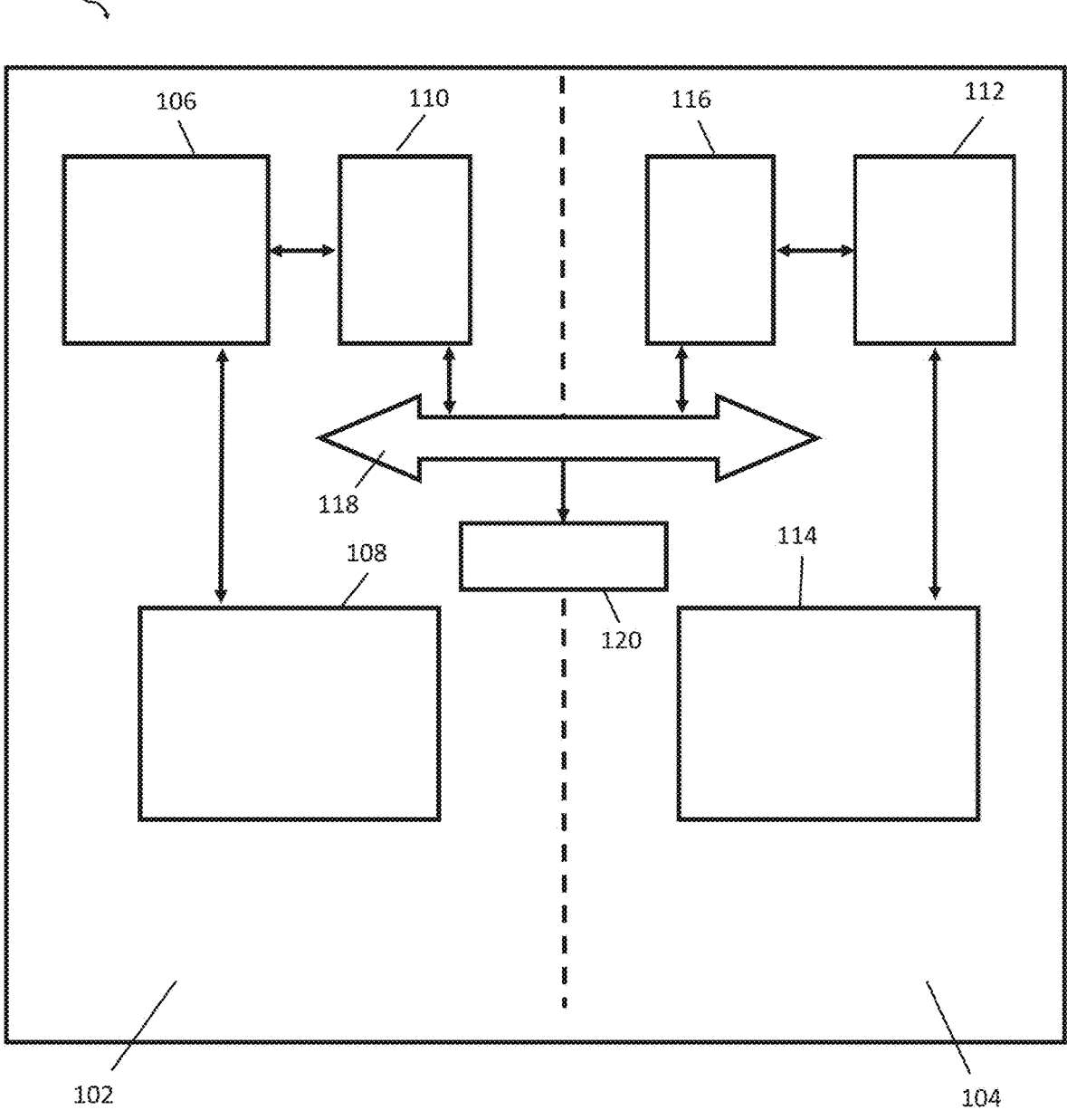
FIG. 1 schematically shows an integrated circuit according to a first embodiment of the present disclosure.

FIG. 1 schematically shows an integrated circuit 100 according to a first embodiment of the present disclosure. The integrated circuit 100 comprises a first processing core 102 and a second processing core 104. Each processing core 102, 104 is operable to execute instructions to perform processing tasks for applications. It will be appreciated that the use of the designations "first" and "second" herein is only to improve legibility and does not imply any hierarchy, unless otherwise stated.

The first processing core 102 comprises a first core controller 106 which is connected to a first memory resource 108 and to a first hardware accelerator module 110. The first memory resource 108 is not directly connected to the first hardware accelerator module 110; instead, the first hardware accelerator module 110 may only obtain data from the first memory resource 108 via the first core controller 106.

Similarly, the second processing core 104 comprises a second core controller 112 which is connected to a second memory resource 114 and to a second hardware accelerator module 116. The second memory resource 114 is not directly connected to the second hardware accelerator module 116; instead, the second hardware accelerator module 116 may only obtain data from the second memory resource 114 via the second core controller 112.

The integrated circuit 100 further comprises a shared bus 118 configured to allow communication between the two processing cores 102, 104 (which are otherwise isolated from one another) via the hardware accelerator modules 110, 116. The shared bus 118 is connected to a shared memory resource 120 and to the first and the second hardware accelerator modules 110, 116. By means of the shared bus 118, data retrieved from the first memory resource 108 may be shared with the second processing core 104; and data retrieved from the second memory resource 114 may be shared with the first processing core 102. In addition, data retrieved from the shared memory resource 120 may be shared with either of the processing cores 102, 104.

The two processing cores 102, 104 are configured to process different applications, preferably simultaneously. In an embodiment, the two processing cores 102, 104 are heterogeneous, that is to say the two processing cores 102, 104 are configured differently from one another. For example, in an embodiment, the first processing core 102 has a faster clock frequency than the second processing core 104. In another embodiment, the second processing core 104 has a faster clock frequency than the first processing core 102. In an embodiment, the core controller 106 is a different type of controller to the core controller 112. In an embodiment, the first memory resource 108 is configured differently to the second memory resource 114. It will be appreciated, however, that in other embodiments, the two processing cores 102, 104 (and/or individual components thereof) may have the same configuration.

Figure 2:
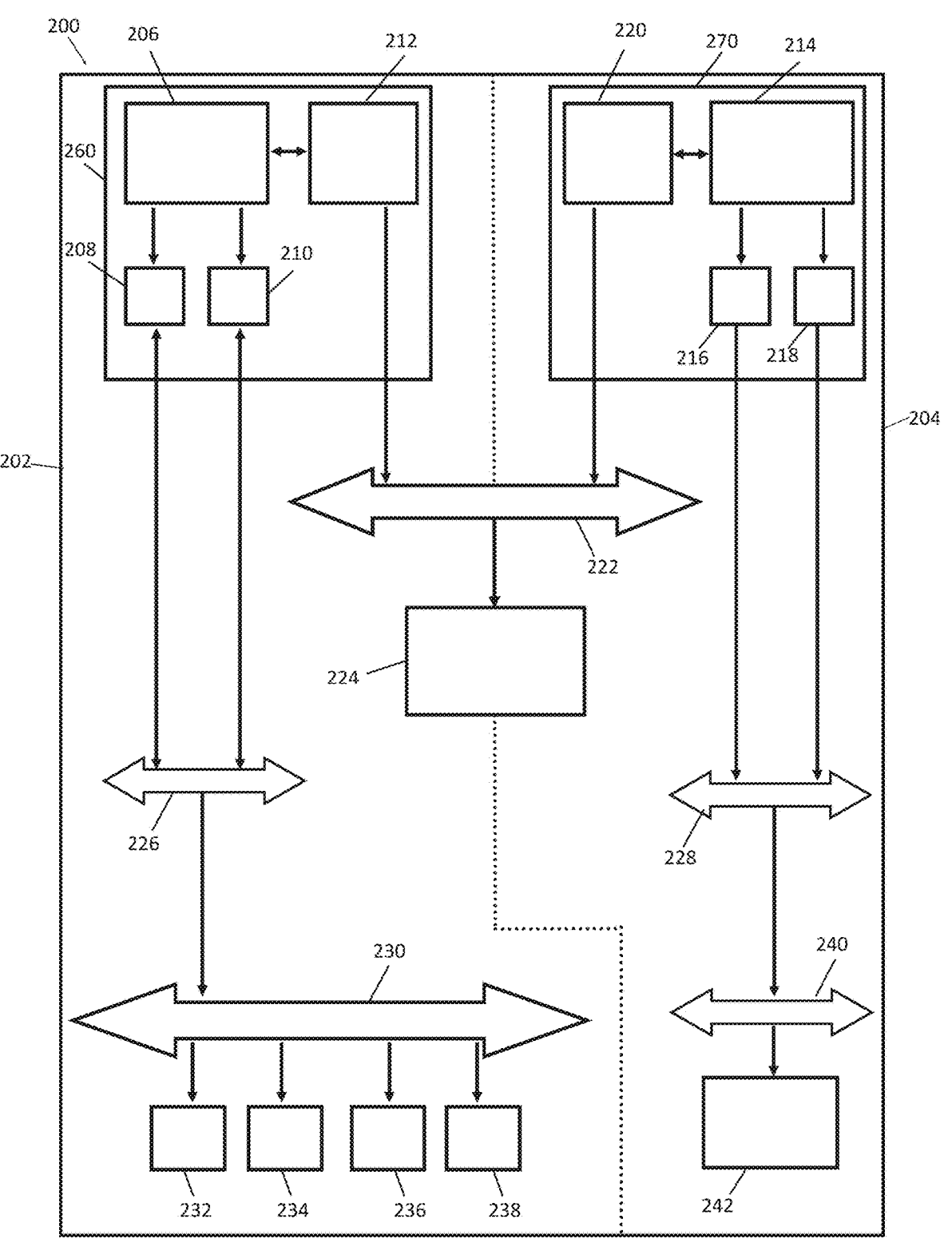
FIG. 2 schematically shows an integrated circuit according to a second embodiment of the present disclosure.

FIG. 2 schematically shows an integrated circuit according to a second embodiment of the present disclosure. The integrated circuit 200 comprises a first subsystem 202 and a second subsystem 204.

The first subsystem 202 comprises a processing core 260 comprising a core controller 206. The core controller 206 is connected to an instruction memory resource 208 and a data memory resource 210. The core controller 206 is also connected to a hardware accelerator module 212. The memory resources 208, 210 are not directly connected to the hardware accelerator module 212. In an embodiment, the data memory resource is a tightly integrated data memory. In an embodiment, the instruction memory resource is a tightly integrated instruction memory. By providing one or more tightly integrated memory resources, time determinism in the subsystems 202, 204 can be improved since tightly integrated memory resources provide low-latency access and have reduced unpredictability of access time compared to, e.g., cache memory. As such, predictability of command execution times within the subsystems can be improved.

The first subsystem 202 further comprises a dedicated system bus 226 which is connected between the processing core 260 and a peripherals bus 230. In an embodiment, the system bus 226 may be connected to the processing core 260 and peripherals bus 230 by means of a crossbar connection; in other words, using a grid of connections. In this way, contention in the subsystem can be minimised since multiple alternative paths are provided on the system bus 226.

The peripherals bus 230 is configured to be connected to one or more peripheral resources 232, 234, 236, 238. The peripheral resources may include interfaces to other systems or subsystems, e.g., within an avionics system. For example, the peripheral resources 232, 234, 236, 238 may include a CAN bus, a Serial Peripheral Interface (SPI), an I2C interface, or an ARINC 429 interface. Alternatively or in addition, the peripheral resources 232, 234, 236, 238 may include one or more external memory resources.

The second subsystem 204 comprises a processing core 270 comprising a core controller 214. The core controller 214 is connected to an instruction memory resource 216 and a data memory resource 218. The core controller 214 is also connected to a hardware accelerator module 220. The memory resources 216, 218 are not directly connected to the hardware accelerator module 220.

The second subsystem 204 further comprises a system bus 228 which is connected between the processing core 270 and a memory bus 240. In an embodiment, the system bus 228 may be connected to the processing core 270 and memory bus 240 by means of a crossbar connection; in other words, using a grid of connections. In this way, contention in the subsystem can be minimised since multiple alternative paths are provided on the system bus 228.

The memory bus 240 is configured to be connected to one or more memory resources 242. The one or more memory resources 242 may include one or more external memory resources. The one or more memory resources 242 may comprise a scratchpad memory.

The integrated circuit 200 also comprises a shared bus 222 and a shared memory resource 224. The first and second subsystems 202, 204 are isolated from one another such that the only communication path between the two subsystems 202, 204 is via the hardware accelerator modules 212, 220 and the shared bus 222. By providing each of the subsystems with dedicated resources (e.g., dedicated memory resources, dedicated system bus), it is possible to reduce or avoid contention within the system since the two processing cores do not compete with one another for access to those resources.

Figure 3:
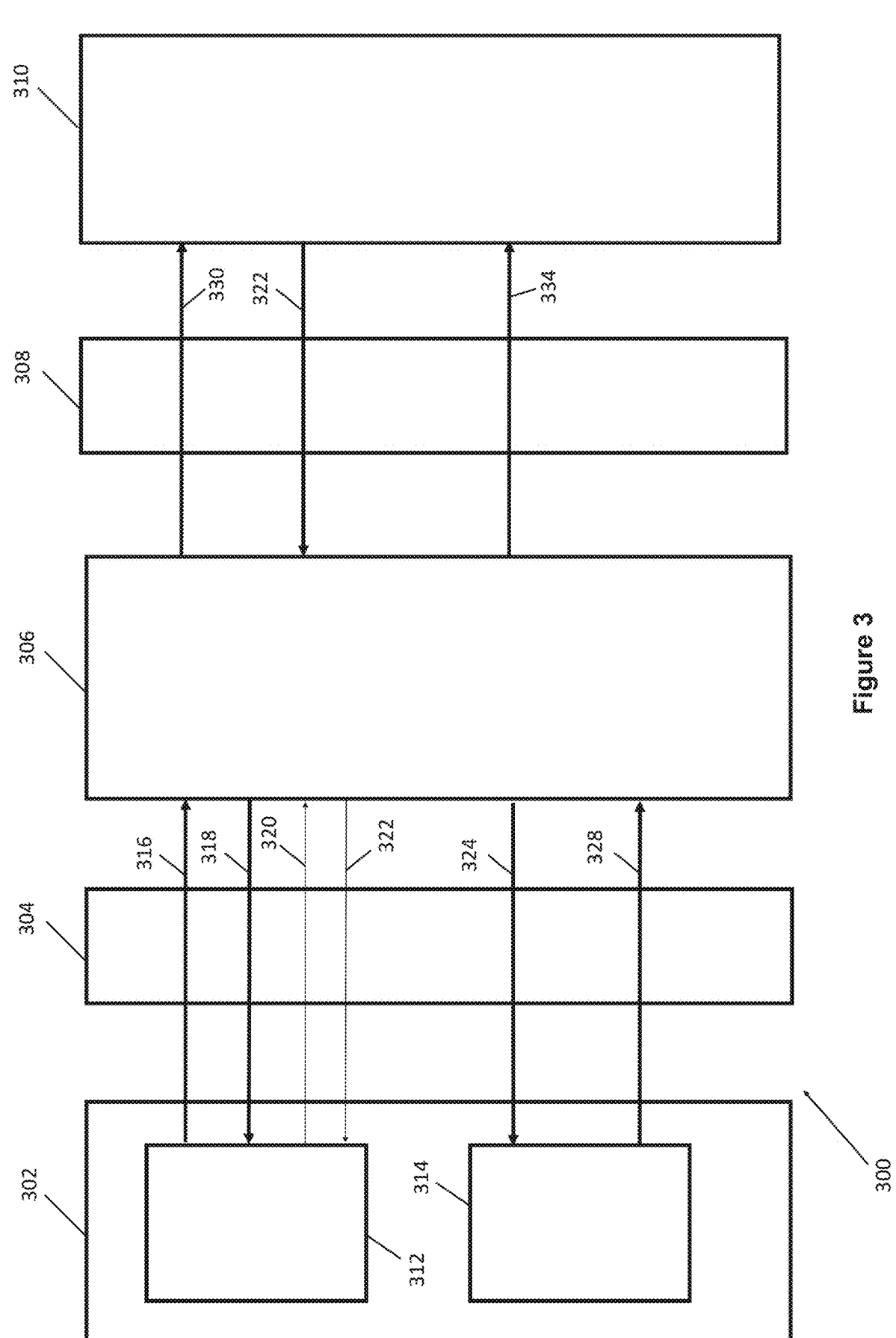
FIG. 3 schematically shows communication between a processing core and the shared bus of an integrated circuit according to a third embodiment of the present disclosure.

FIG. 3 schematically shows communication between a processing core 302, a hardware accelerator module 306, and a shared bus 310 in an integrated circuit 300 according to the present disclosure. The communication between the processing core 302 and the hardware accelerator module 306 takes place via an interface 304. In an embodiment, the interface 304 is a Custom Instructions Interface. Any suitable and desired Custom Instructions Interface may be used in accordance with the invention. For example, the interface 304 may be an RoCC interface. It will further be appreciated that any suitable and desired embedded processor that supports such a Custom Instructions Interface may be used in connection with the subject-matter disclosed herein. Some examples of suitable embedded processors include Intel Nios II, Xilinx MicroBlaze, etc.

The communication between the hardware accelerator module 306 and the shared bus 310 takes place via a further interface 308. The further interface 308 may be any suitable and desired interface. The further interface 308 illustrated in FIG. 3 is configured to operate using standard bus protocol. In an embodiment, the further interface 308 operates using the known TileLink bus.

The hardware accelerator module 306 is configured to perform cryptographic operations for the processing core 302. In an embodiment, the hardware accelerator module 306 encrypts data provided by the processing core 302 before forwarding the encrypted data to the shared bus 310. In an embodiment, the hardware accelerator module 306 decrypts data provided via the shared bus 310 and forwards the decrypted data to the processing core 302. Secure sharing of data between processing cores can thus be ensured. It will of course be appreciated that the hardware accelerator module 306 may also forward encrypted data, for example, in the event that data is to be sent to an external communication interface.

The processing core 302 comprises a core controller 312 configured to send an instruction signal 316 to the hardware accelerator module 306 via interface 304. In an embodiment, the instructions are instructions from the known RISC-V instruction set. Using an open instruction set such as RISC-V makes it possible to reduce the time spent developing, testing, and verifying custom system-on-chip architectures. It also makes it possible to introduce custom instructions at the microarchitecture level.

A further advantage of using known instructions sets such as RISC-V with known protocols such as the ROCC protocol is that this provides improved visibility over the system behaviour. Formal verification of the system operation can be facilitated as a result, and certification becomes less onerous than in systems to date. Confidence in the ability of the system to handle high criticality applications in a secure manner can be improved as a result of the intense verification process and relative ease of certification as a result of the improved oversight.

The core controller 312 is also configured to send a verification signal 320 to the hardware accelerator module 306 to prove that the instruction signal 316 is a valid instructions signal. In this way, the hardware accelerator module 306 can determine whether or not the instructions received from the core controller 312 are from the intended application. In the event of an external attack on the processing core 302, the verification signal 320 would indicate that the instruction signal 316 is not to be trusted. By providing the hardware accelerator module 306 between the core controller 212 and the shared bus 310, an extra layer of security is therefore provided as the shared bus 310 cannot be accessed except through the hardware accelerator module 306.

In the embodiment depicted in FIG. 3, the hardware accelerator module 306 is configured to send a signal 322 to indicate when it is ready to receive instructions from the processing core 302. In other embodiments, the hardware accelerator module 306 may instead or additionally be configured to send a signal when it is unable to receive instructions from the processing core 302.

When the hardware accelerator module 306 receives the instruction signal 316 and determines that it is valid based on the verification signal 320, the hardware accelerator module 306 may send a request for data 330 to the shared bus 310 via further interface 308. As illustrated in FIGS. 1 and 2, the shared bus 310 is connected to a shared memory resource. Data retrieved from the shared memory resource can be sent via the shared bus 310 and the further interface 308 to the hardware accelerator module 306. In particular, data may be sent via signal 332 from the shared bus 310. Although not illustrated, it will be appreciated that a verification signal may also be sent from the shared bus 310 to the hardware accelerator module 306 in order to verify the data being sent via signal 332. In this way, in the event of an external attack on the shared system resources (i.e., shared bus 308 and shared memory resource), access to the processing core 302 can be denied as the hardware accelerator module 306 will not pass the data through if the correct verification signal has not been received.

When the correct verification signal is received by the hardware accelerator module 306 (e.g., when the hardware accelerator module 306 has determined that the verification signal received via the further interface 308 is correct), the hardware accelerator module 306 passes the data retrieved from the shared memory resource to the processing core 302 via the interface 304 using response signal 318. The provided data can then be used by the core controller 312 as required.

The processing core 302 also comprises a memory resource 314. In some applications, it may be desirable for the processing core 302 to provide data to the shared memory resource for use by the other of the two processing cores of the integrated circuit 300. In an embodiment, the processing core 312 sends an instruction signal 316 to the hardware accelerator module 306 to cause the hardware accelerator module 306 to send a data request signal 324 to the memory resource 314. The instruction signal 316 can be verified (validated) by the hardware accelerator module 306 using the verification signal 320 as described above.

In response to receiving the data request signal 324 from the hardware accelerator module 306, the memory resource 314 sends a data signal 328 containing the requested data to the hardware accelerator module 306. In response to receiving the data signal 328 from the memory resource 314, the hardware accelerator module 306 forwards the requested data to the shared bus 310 via the further interface 308 using a further data signal 334. The data can then be accessed by the other processing core of the integrated circuit 300 via the shared bus 310 and the corresponding hardware accelerator module of the other processing core. In an embodiment, the hardware accelerator module 306 sends an interrupt signal via the shared bus 310 to the other processing core of the integrated circuit 300 to indicate that the data is available to access via the shared bus.

It will be appreciated that FIG. 3 shows only the communication paths for one processing core of the two provided on an integrated circuit 300 according to the present disclosure. In an embodiment, the communication paths for the other processing core are similar, preferably identical, to those depicted in FIG. 3.

It will further be appreciated that although the integrated circuits 100, 200, 300 illustrated in the drawings have been discussed as separate embodiments above, the features of any of these embodiments may be combined with features of any other embodiment(s) as is apparent to the skilled person. The figures and their associated description are provided by way of illustration only and are not intended to be limiting.

It will further be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated circuit comprising:

two processing cores, wherein each processing core of the two processing cores comprises:
  a core controller operable to execute instructions to perform one or more processing tasks;
  a memory resource connected to the core controller; and
  a hardware accelerator module connected to the core controller, wherein the hardware accelerator module only obtains data from the memory resource via the core controller, wherein the core controller is configured to send an instruction signal to the hardware accelerator module via an interface, wherein the core controller is configured to send a verification signal to the hardware accelerator module to verify that the instruction signal is a valid signal;

a shared bus connected to a respective hardware accelerator module of the two processing cores, wherein each hardware accelerator module of the two processing cores is configured to perform one or more cryptographic operations to encrypt the data provided by a respective core controller before forwarding the encrypted data to the shared bus; and a shared memory resource connected to the shared bus, wherein the only communication path between the two processing cores is via the hardware accelerator modules and the shared bus.

2. The integrated circuit of claim 1, wherein the two processing cores are heterogeneous.

3. The integrated circuit of claim 2, wherein a clock frequency of a first processing core of the two processing cores is faster than a clock frequency of a second processing core of the two processing cores.

4. The integrated circuit of claim 1, further comprising: two isolated subsystems;
  wherein each processing core of the two processing cores is associated with a respective subsystem of the two isolated subsystems;
  wherein each subsystem comprises a dedicated system bus configured to connect a respective associated processing core to one or more components of the subsystem; and
  wherein the dedicated system bus of a first subsystem of the two isolated subsystems is isolated from the dedicated system bus of a second subsystem of the two isolated subsystems.

5. The integrated circuit of claim 4, wherein each dedicated system bus is connected to the respective associated processing core by means of a crossbar connection.

6. The integrated circuit of claim 4, wherein the first subsystem of the two isolated subsystems further comprises an external memory bus configured to be connected to an external memory resource.

7. The integrated circuit of claim 4, wherein the second subsystem of the two isolated subsystems further comprises a peripherals bus configured to be connected to one or more peripheral resources.

8. The integrated circuit of claim 1, wherein the memory resource of each processing core comprises a data memory resource and an instruction memory resource.

9. The integrated circuit of claim 8, wherein the data memory resource is a tightly integrated data memory.

10. The integrated circuit of claim 8, wherein the instruction memory resource is a tightly integrated instruction memory.

11. The integrated circuit of any claim 1, wherein the hardware accelerator module of each processing core is configured to execute instructions from the RISC-V instruction set.

12. The integrated circuit of claim 11, wherein the hardware accelerator module of each processing core is configured to communicate with an associated processing core using a custom instruction interface.

13. The integrated circuit of claim 1, wherein the hardware accelerator module is configured to provide data from the memory resource of a first processing core of the two processing cores to the shared memory resource via the shared bus.

14. The integrated circuit of claim 13, wherein the hardware accelerator module is further configured to send an interrupt signal to a second processing core of the two processing cores to indicate that new data is available in the shared memory resource.

* * * * *